United States Patent [19]
Linke, Sr.

[11] 3,830,007
[45] Aug. 20, 1974

[54] FISHING LINE SPOOL HOLDER

[76] Inventor: Frank D. Linke, Sr., 113 Lakeside Rd., Hewitt, N.J. 07421

[22] Filed: May 22, 1973

[21] Appl. No.: 362,929

[52] U.S. Cl..................... 43/25, 43/22, 242/84.1 R
[51] Int. Cl............................................ A01k 87/06
[58] Field of Search ............ 43/25, 25.2, 20, 22, 24; 242/84.1 R, 84.1 K

[56] References Cited
UNITED STATES PATENTS

| | | | |
|---|---|---|---|
| 2,084,251 | 6/1937 | Haislip | 242/84.1 R |
| 2,599,219 | 6/1952 | Berchak | 43/20 |
| 2,899,768 | 8/1959 | Steinauer | 43/25 X |
| 3,199,242 | 8/1965 | Holmstrom | 43/25 |
| 3,506,213 | 4/1970 | Young | 242/84.1 R |
| 3,516,191 | 6/1970 | Baenziger | 43/25 |
| 3,776,485 | 12/1973 | Foley et al. | 43/25 X |

Primary Examiner—James H. Czerwonky

[57] ABSTRACT

A device adapted for use with a fishing pole having line guides varying in diameter and disposed axially along the pole. The pole has a reel adjacent the handle. The largest diameter guide is disposed adjacent the reel. The guides are disposed in order of gradually decreasing diameter with the minimum diameter disposed at the tip of the pole. A spool holder member is provided with first means adapted to detachably frictionally engage the rod exterior at a point intermediate the guides of largest and next largest diameter and second means adapted to extend at right angles to the pole. The second means has opposite ends which have tips pointing inwardly toward each other and disposed along a common axis. A hollow cylinder open at both ends has an axis aligned with the common axis, each tip detachably engaging a corresponding end of the cylinder.

2 Claims, 4 Drawing Figures

PATENTED AUG 20 1974　　　　　　　　　　　3,830,007

FISHING LINE SPOOL HOLDER

SUMMARY OF THE INVENTION

My invention is directed toward a device for enabling a new line to be wound properly upon a reel while the reel is secured to a fishing pole in such manner as to eliminate twisting, knotting and application of improper tension.

To this end I provide a device having first means adapted to detachably engage the rod at a point intermediate the largest diameter line guide and the next largest diameter line guide. The rod in conventional manner has the largest diameter guide disposed adjacent the reel with the guides arranged along the pole in spaced position in order of gradually decreasing diameter from handle to tip. The member has second means adapted to extend at right angles to the pole, the second means having opposite ends which have tips pointing toward each other and disposed along a common axis. A hollow cylinder open at both ends is disposed between the tips, with each tip detachably engaging a corresponding end of the cylinder.

A spool carrying a line has an axial bore and is detachably connected to the second means, the cylinder extending through the bore of the spool. The line from the spool is passed through the largest guard onto the reel. The user can then turn the handle of the reel to wind the line thereon.

DETAILED DESCRIPTION OF PREFERRED EMBODIMENTS

Figure 1:
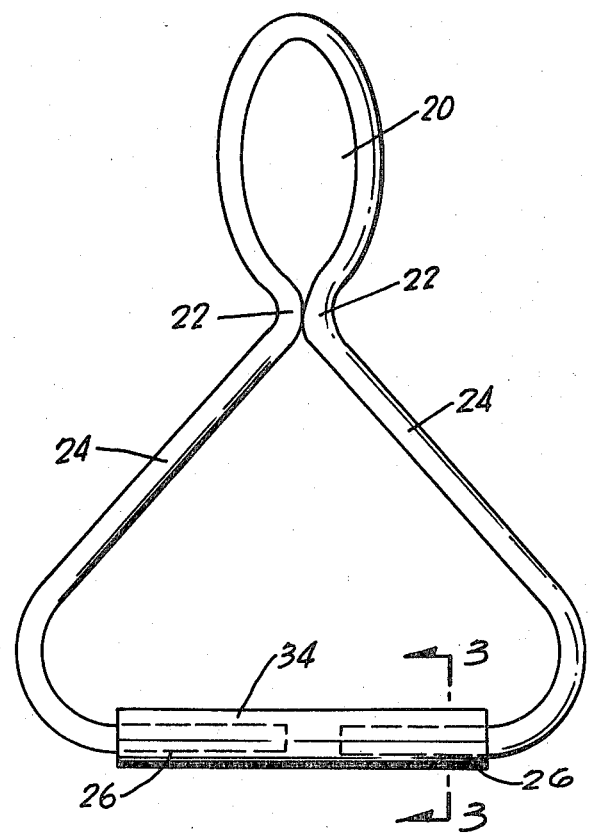
FIG. 1 is a side view of my invention.
Figure 2:
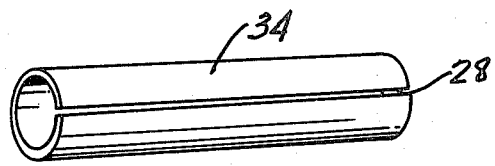
FIG. 2 is a perspective view of a part used in my invention.
Figures 3, 4:
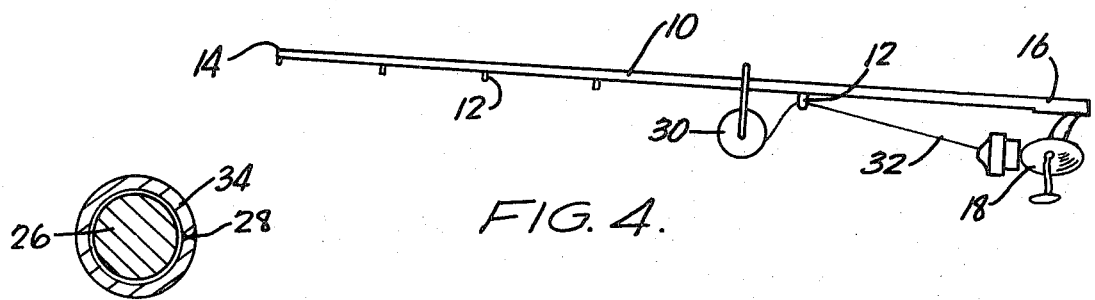
FIG. 3 is a view taken along line 3—3 in FIG. 1.
FIG. 4 is a side view of my invention in use.

Referring now to FIGS. 1–4, a fishing pole 10 has a plurality of line guides 12 disposed in spaced positions along the pole from tip 14 to handle 16. The guides are arranged in order of gradually increasing diameter from a minimum at the tip to a maximum adjacent reel 18.

A length of stainless steel spring wire is bent and shaped to form a flat structure having a loop 20 with adjacent ends 22. Ends 22 normally touch but can be momentarily pushed apart whereby the loop can be snap fitted onto the rod adjacent the largest diameter guide and the next largest guide, the loop lying in a plane disposed at right angles to the direction of extension of the rod.

The ends of the loop are integral with arms 24 which extend inclinedly outward to ends having tips 26 which point inward toward each other. These tips are spaced apart but are disposed along a common axis. Tips, arms and loop form a common plane.

Elongated hollow plastic cylinder 34 open at both ends and having a slit 28 which extends axially between the ends is disposed between the tips, with each tip detachably engaging a corresponding end.

A spool 30 carrying line 32 has an axial bore. In use the cylinder is removed from the tips, passed through the bore and reengaged whereby the line can be passed through the largest guide onto the reel and wound thereon.

While I have described my invention with particular reference to the drawings, such is not to be considered as limiting its actual scope.

Having thus described this invention, what is asserted as new is:

1. A spool holder device adapted for use with a fishing pole having line guides varying in diameter and disposed axially spaced along the pole, the pole having a reel adjacent the handle, the largest diameter guide being disposed adjacent the reel, the guides being disposed in order of gradually decreasing diameter with the minimum diameter guide disposed at the tip of the pole, said device comprising:
   a one-piece member formed from a single length of springy material and constituted by first and second means disposed in a common plane, the first means defining an aperture and being detachably snap fitted around the rod exterior and frictionally engaging the rod at a point intermediate the guides of largest and next largest diameters, the second means extending at right angles to the pole and having opposite in-turned ends which have tips pointing toward each other and disposed along a common axis; and
   a hollow smooth cylinder open at both ends, each end being detachably engaged by a corresponding one of said tips, the axis of the cylinder being aligned with said common axis.

2. The device of claim 1 wherein said first means includes a loop having adjacent ends which are normally abutting but which can be temporarily separated.

* * * * *